United States Patent [19]

Schmoyer

[11] Patent Number: 4,480,521

[45] Date of Patent: Nov. 6, 1984

[54] SYSTEM AND METHOD FOR INSTRUCTION IN THE OPERATION OF A KEYBOARD MUSICAL INSTRUMENT

[76] Inventor: Arthur R. Schmoyer, Capital Yacht Club, 600 Water St. SW., Washington, D.C. 20022

[21] Appl. No.: 404,895

[22] Filed: Aug. 3, 1982

Related U.S. Application Data

[63] Continuation-in-part of Ser. No. 277,612, Jun. 24, 1981.

[51] Int. Cl.³ .............. G09B 15/08; G10G 3/04; G10H 7/00
[52] U.S. Cl. .................... 84/1.28; 84/115; 84/462; 84/478
[58] Field of Search ............... 84/478, 479 R, 479 A, 84/1.28, 115, 462

[56] References Cited

U.S. PATENT DOCUMENTS

| | | | |
|---|---|---|---|
| 3,350,973 | 11/1967 | Weis et al. | 84/478 |
| 4,031,797 | 6/1977 | Schmoyer | 84/478 X |
| 4,054,868 | 10/1977 | Rose | 84/478 X |
| 4,281,579 | 8/1981 | Bennett, Sr. | 84/478 |

OTHER PUBLICATIONS

NAMM Music & Sound Expo Issue "The Music Trades", May 25, 1982, pp. 90, 92, and 94.

*Primary Examiner*—Stanley J. Witkowski
*Attorney, Agent, or Firm*—Wenderoth, Lind & Ponack

[57] ABSTRACT

A system and method for instruction in the operation of a keyboard musical instrument, namely, an organ or piano. The system and method teaches the proper fingering for chord triads in the root, first, and second positions so as to play chord triads in the space of a single octave. The system may be operated manually by the student or, in some embodiments thereof, the system may be operated automatically by means of an external storage media device such as a video disc player.

6 Claims, 19 Drawing Figures

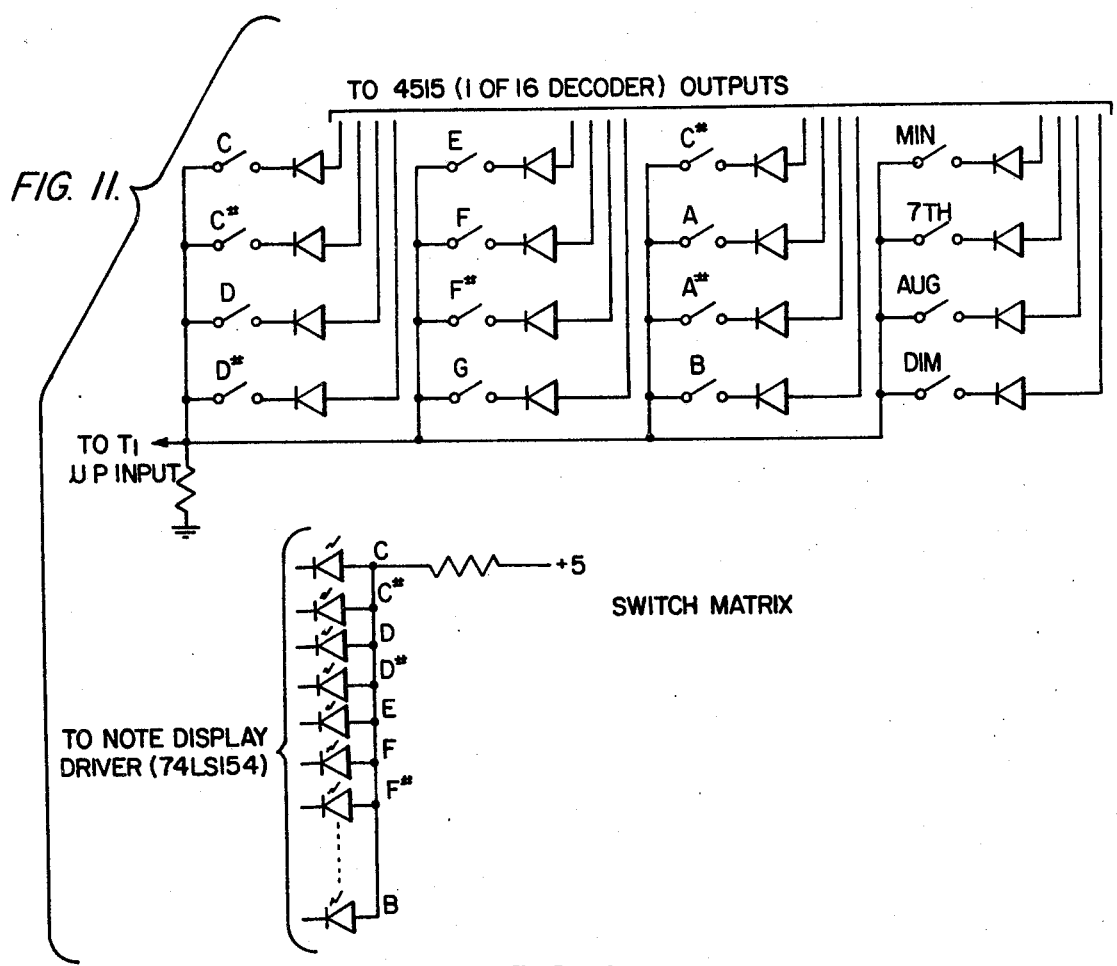

4,480,521

SYSTEM AND METHOD FOR INSTRUCTION IN THE OPERATION OF A KEYBOARD MUSICAL INSTRUMENT

CROSS REFERENCE TO RELATED APPLICATIONS

This application is a continuation-in-part of now abandoned U.S. application Ser. No. 277,612, filed June 24, 1981, now abandoned.

BACKGROUND OF THE INVENTION

1. Field of the Invention

The present invention relates to a system and method for instruction in the operation of a keyboard musical instrument. More particularly, the present invention is directed to a system and method for teaching the playing of chord triads on an organ or piano.

2. Description of the Prior Art

Also in U.S. Pat. No. 3,335,630 issued Aug. 15, 1967, a visual chord teaching device is described in which indicators visually associated with individual keys of a keyboard are controlled so as to provide an indication of a triad of keys to be manipulated in sounding a chord. These indicators are activated in response to the depression of the clavial pedal which sounds the root note of the desired triad. The device is particularly adapted to teaching the sounding of sustained chord notes as in commonly employed in playing an organ.

In U.S. Pat. Nos. 3,503,296 and 3,503,297, both issued Mar. 31, 1970, similar indications are obtained in response to the sounding of the root note key on the same portion of the keyboard upon which the chord is to be sounded. Again, the system is primarily directed to instruction in the sounding of sustained note chords.

Also in U.S. Pat. No. 3,335,630, there is described a technique of fingering keys in playing chord triads identified as the 5-2-1 system.

In U.S. Pat. No. 3,954,040, issued May 4, 1976, an apparatus and system for instruction in the manipulation of the chord portion of a keyboard of a musical instrument in 3-4 or 4-4 time is disclosed, the apparatus and system including uniquely written music which provides a student with an identity of the root note of each chord to be played and the timing (but not necessarily) the identity) of the corresponding chord triad to follow the root note. In conjunction with the music, an apparatus senses the depression of the root note key by the student, provides a sustained confirming identification of that note, and provides the identity (but not the timing) of the triad notes. The indication is retained until a different note key is depressed.

In U.S. Pat. No. 4,031,797, issued June 28, 1977, a self-contained pocket-sized unit is disclosed for use as a self-study aid in the teaching of the make-up of musical chord triads.

SUMMARY OF THE INVENTION

An object of this invention is to provide a system and method of effectively teaching the playing of chord triads on a keyboard type musical instrument, namely, an organ or piano.

A further object of this invention is to provide a system and method as above which utilizes a self-contained interactive device having switches and a display.

A still further object of this invention is to provide a system and method as above which utilizes a self-contained interactive device which may be controlled by an external storage media device.

A further object of this invention is to provide a system and method as above which utilizes a self-contained interactive device which may operate an additional external display.

A still further object of this invention is to provide a system and method as above which utilizes a self-contained device having the above noted features but wholly contained within a keyboard type musical instrument, namely, an organ or piano.

Lastly, a further object of this invention is to provide a system and method which utilizes a self-contained device as above interfaced with a self-contained miniaturized portable keyboard type musical instrument, namely, a small pocket-sized electronic organ or piano.

BRIEF DESCRIPTION OF THE DRAWINGS

FIGS. 10-12 illustrate partial schematic diagrams of a modified embodiment of the present invention.

DESCRIPTION OF THE PREFERRED EMBODIMENTS

Figure 1:
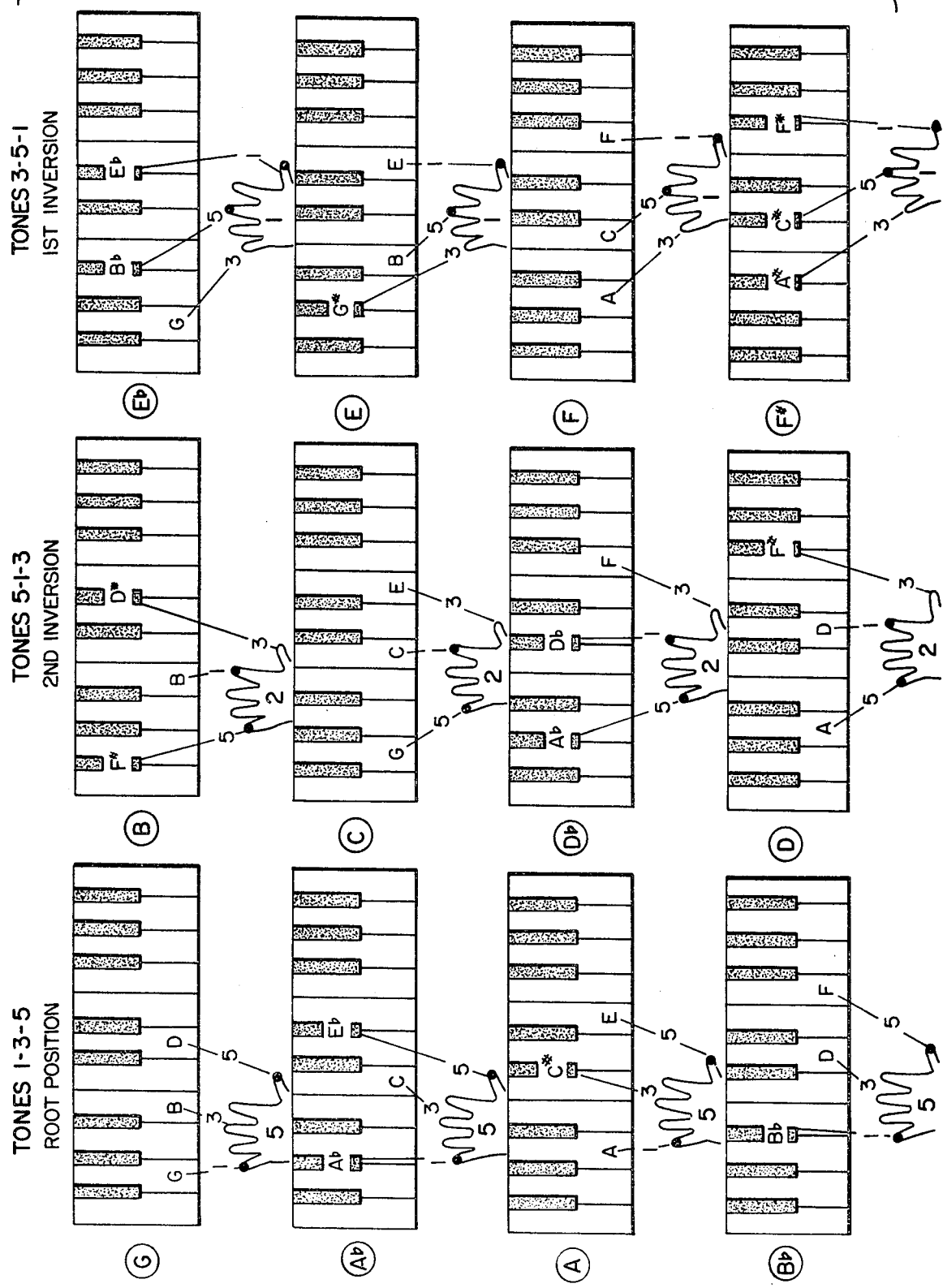
FIG. 1 illustrates the finger positions for playing the twelve major chords in the 1-3-5 Tone system.

FIG. 1 illustrates the basic concept of the 1-3-5 Tone system. The circled letters denote the chord symbol. That is, the chord shown in the upper lefthand corner of FIG. 1 is the G cord.

To play a simple major chord triad, three keys are played simultaneously, thus sounding three tones. These three tones are called the first, third, and fifth tones.

You will note that FIG. 1 illustrates twelve different major chords. The first column of chords on the left of FIG. 1 denote the G, A-flat, A, and B-flat chords and are played in the root position.

In the root position, the little finger plays the root key (also called the first tone) which bears the same name as the chord to be played. That is, the G chord is played with the little finger playing the G key, the index finger playing the B key (the third tone), and the thumb playing the D key (the fifth tone).

In the middle column of chords, called the second inversion, the first tone, which always bears the same name as the chord being played, is played by the index finger. That is, the B chord is played by playing the F-sharp key (the fifth tone) with the little finger the B key (the first tone) with the index finger, and the D-sharp key (the third) with the thumb.

The rightmost column of FIG. 1, called the first inversion, illustrates the key bearing the same name as the chord (the first tone) being played with the thumb. That is, the E-flat chord is played by playing the G key (the third tone) with the little finger, the B-flat key (the fifth tone) with the middle finger and the E-flat key (the first tone) with the thumb.

You will note that in playing the twelve major chords in the 1-3-5 Tone system, the left hand stays in the range of only one octave.

Figure 2:
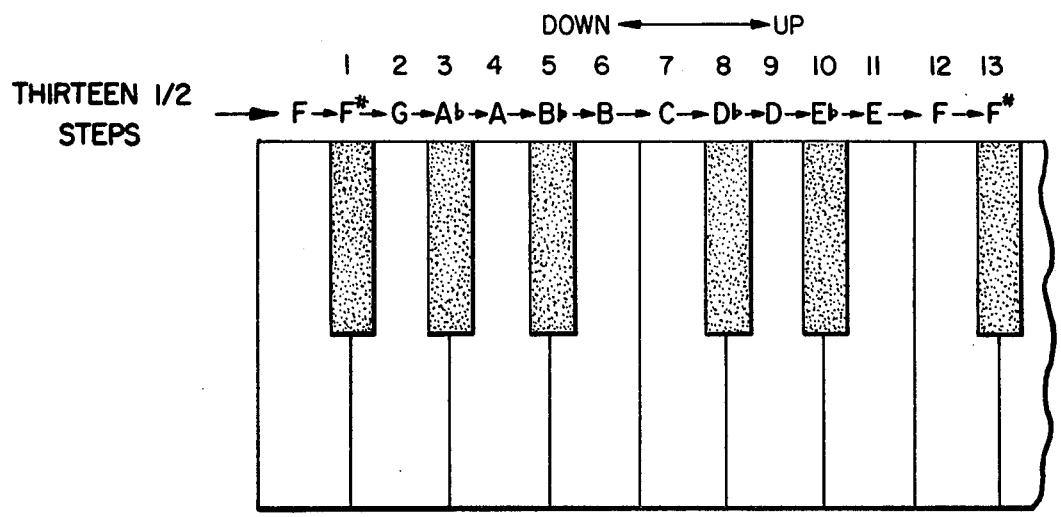
FIG. 2 illustrates a portion of the keyboard showing the relationship of the thirteen half steps comprising an octave.

In order to play other chords in the 1-3-5 Tone system, it is first necessary to explain half steps and whole steps referring to FIG. 2 of the drawings.

FIG. 2 illustrates the thirteen half steps making up an octave. The separation between each key name is defined to be a half step. That is, going up from bottom F (the leftmost key), there are thirteen half steps up to F-sharp (the black key on the extreme right). Going up from F to the black F-sharp key constitutes going up a half step. Going up from F-sharp to the G key also constitutes going up a half step. Going from B down to the black B-flat key constitutes going down a half step. Going from the B-flat key down to the A key also constitutes going down a half step, etc.

A whole step equals two half steps. That is, going from the B key up to the D-flat key constitutes going up a whole step. Going from the D-flat key up to the E-flat key also constitutes going up a whole step. Going from the B key down to the A key constitutes going down a whole step, etc.

To play a minor chord, one plays what are called the major chords as shown in FIG. 1 only lowering the third tone one half step (1 key). That is, to play a G minor chord, the little finger plays the G key, the middle finger plays the B-flat key and the thumb plays the D key.

To play an augmented chord, the chord is played as shown in FIG. 1 only the fifth tone is raised one half step (1 key). That is, an augmented G chord is played by playing the G key with the little finger, the B key with the middle finger, and the E-flat key with the thumb.

A diminished chord is played as shown in FIG. 1 only the third and fifth tones are both lowered one half step (1 key). That is, a diminished G chord is played by playing the G key with the little finger, the B-flat key with the middle finger, and the D-flat key with the thumb.

A seventh chord is played by adding a fourth tone played one whole step (2 keys) down from the first tone to the corresponding major chord. That is, a G seventh chord is played by playing the three keys constituting the major G chord (as shown in FIG. 1) but simultaneously playing the bottom F key (the key to the extreme left).

A sixth chord is played by adding a fourth tone played one whole step (2 keys) up from the fifth tone. That is, a G sixth chord is played by playing the three keys constituting the major G chord (as shown in FIG. 1) but simultaneously playing the E key.

A sixth minor chord is played exactly as noted above for the sixth chord only the third tone is lowered one half step (1 key). That is, a G sixth minor chord is played as above, only the middle finger plays the B-flat key rather than the B key.

A ninth chord is played as noted above with regard to the seventh chord, only the first tone is raised one whole step (2 keys). That is, a G ninth chord is played by simultaneously playing the A, B, D, and bottom F keys.

Figure 3:
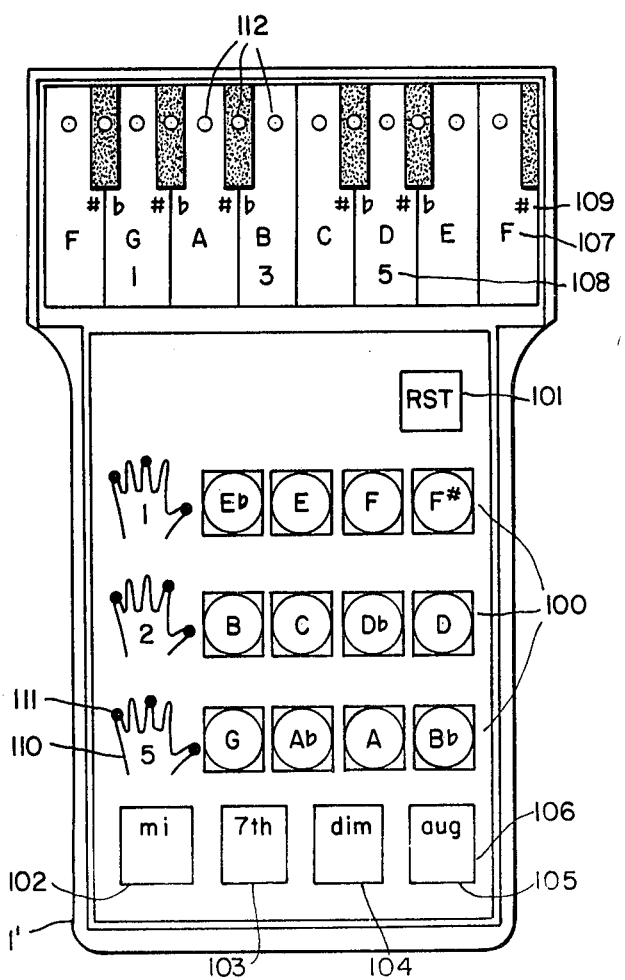
FIG. 3 illustrates a hand-held device in accordance with the present invention.

FIG. 3 illustrates a self-contained interactive device 1' in accordance with the present invention.

Figure 4:
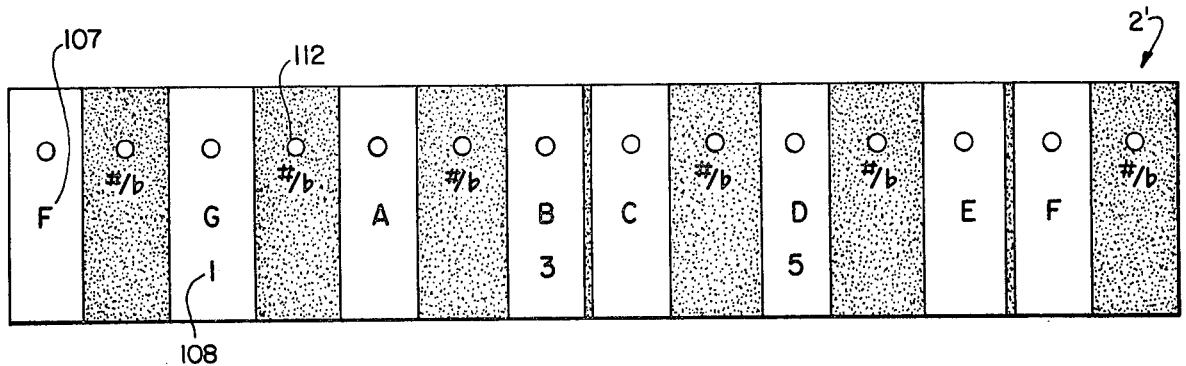
FIG. 4 illustrates an external display in accordance with the present invention.

FIG. 4 illustrates an optional external display 2' which may be utilized with the self-contained device 1' of FIG. 3. The format of the display 2' of FIG. 4 may also be optionally used in place of the display 109 of the self-contained device 1' of FIG. 3.

As illustrated in FIG. 3, the self-contained device 1' has twelve push-buttons 100 corresponding to the twelve major chords.

Push-button 101 is used to reset the device and push-buttons 102-105 respectively operate the device to teach the minor, seventh, diminished, and augmented chords. It is understood that additional push-buttons may be added for the sixth, ninth, etc. chords.

The display 109 corresponds to the thirteen half steps illustrated in FIG. 2 of the drawings. Alpha characters 107 mark the keys and numerics 108 are generated by multicolor display devices (e.g.—multicolor LED displays) and are used to illustrate the three tones making up the 1-3-5 tone system. The keys themselves may also light up.

Indicators 112 (e.g.—LED) indicate the keys to be played.

It is noted that push-buttons 102-105 have built-in indicators to indicate their activation.

As a further aid, it is noted that illustrations of hands 110 containing miniature indicators 111 also form part of the device. These miniature indicators indicate the three tones forming the triad to be played.

As a further aid in learning the 1-3-5 tone system, it is noted that the three tones are consistently color coded. That is, the first tone is always shown in red, the third tone is always shown in yellow, and the fifth tone is always shown in green. Both the displays and indicators may be so coded.

The operation of the device 1' illustrated in FIG. 3 is as follows:

To learn how to play a G-major chord, the switch 100 labelled G is pressed and released.

In response to that, the indicator 112 for the G key 107 will light up. On the hand display 110, the display 111 on the little finger of the lower most hand (having a 5 therein) will light up red, the middle finger will light up yellow, and the thumb will light up green. The numerics 108 will light up on the keyboard display will light up as shown in FIG. 3, (i.e.—a 1 under G, a 3 under B, and a 5 under D). Lastly, the displays 112 over the G, B, and D keys will light, the display 112 over G flashing on and off intermittently to indicate the root key being played.

To have the display 109 indicate the G-minor chord rather than the G-major chord, the push-button switch 102 is pressed. All of the above-noted displays remain unchanged except that the display 112 over the B key will turn off and the display 112 over the B-flat key will light up. In addition, the indicator for the minor push-button 102 will be lit. Thus, the display 109 illustrates the rule that to change a chord from a major chord into a minor chord, it is necessary to lower the third tone one half step.

In a similar fashion, to change the display chord to the seventh, diminished, or augmented chord, etc., it is merely necessary to press the respective push-buttons 103–105 and the display 109 will show that chord.

That is, to change from the G-minor chord to the seventh chord, it is merely necessary to press the seventh push button 103. By doing so, the indicator for the seventh push-button 103 will light, the G key stays lit, on the hand display 110, the root finger display 111 remains the same, the tone numerics 108 remain unchanged, the indicators 112 over G, B-flat, and D change back to G, B and D, and the indicator 112 over the F key turns on (i.e.—the F key below or to the left of G). Thus, the display 109 illustrates the rule that to change from a major chord to a seventh chord, one merely adds a fourth tone one whole step down from the first tone.

In a similar fashion, the diminished push-button 104 and augmented push-button 105 operate the display so as to illustrate the proper fingering for the diminished and augmented chords.

To reset the display 109, it is merely necessary to push the reset push-button 101.

It is also noted that the remote display 2' illustrated in FIG. 4 of the drawings operates in a virtually identical fashion to that of display 109. In fact, the actual display format is virtually interchangeable.

While the present invention has been shown as a hand-held unit with an optional external display in FIGS. 3 and 4 of the drawings, it is of course understood that either the external display 2' or the device 1' either alone or in combination with the external display 2' may be built into an organ.

Furthermore, as another concept utilizing the present invention, the operation of the twelve chord push-buttons 100, the four alternate configuration push-buttons 102–105, and the reset push-button 101 may be externally operated utilizing an external signal generator. More particularly, the external signal generator may be operated to control the device 1' by means of data recorded on a recording medium (e.g.—an audio cassette, a video cassette, a video disc, etc.). In addition, by utilizing a video cassette or video disc as the recording medium, it is possible to view on a television display the actual picture of a hand correctly fingering the chord displayed on the display 2' or the display 109 while simultaneously listening to the actual sound of the chord being displayed. This results in a positive reinforcement for the student. That is, he sees the chord being displayed on the display 109 or 2', he sees the actual fingering of the displayed chord on the television display, and he hears the actual chord being played.

Figure 5:
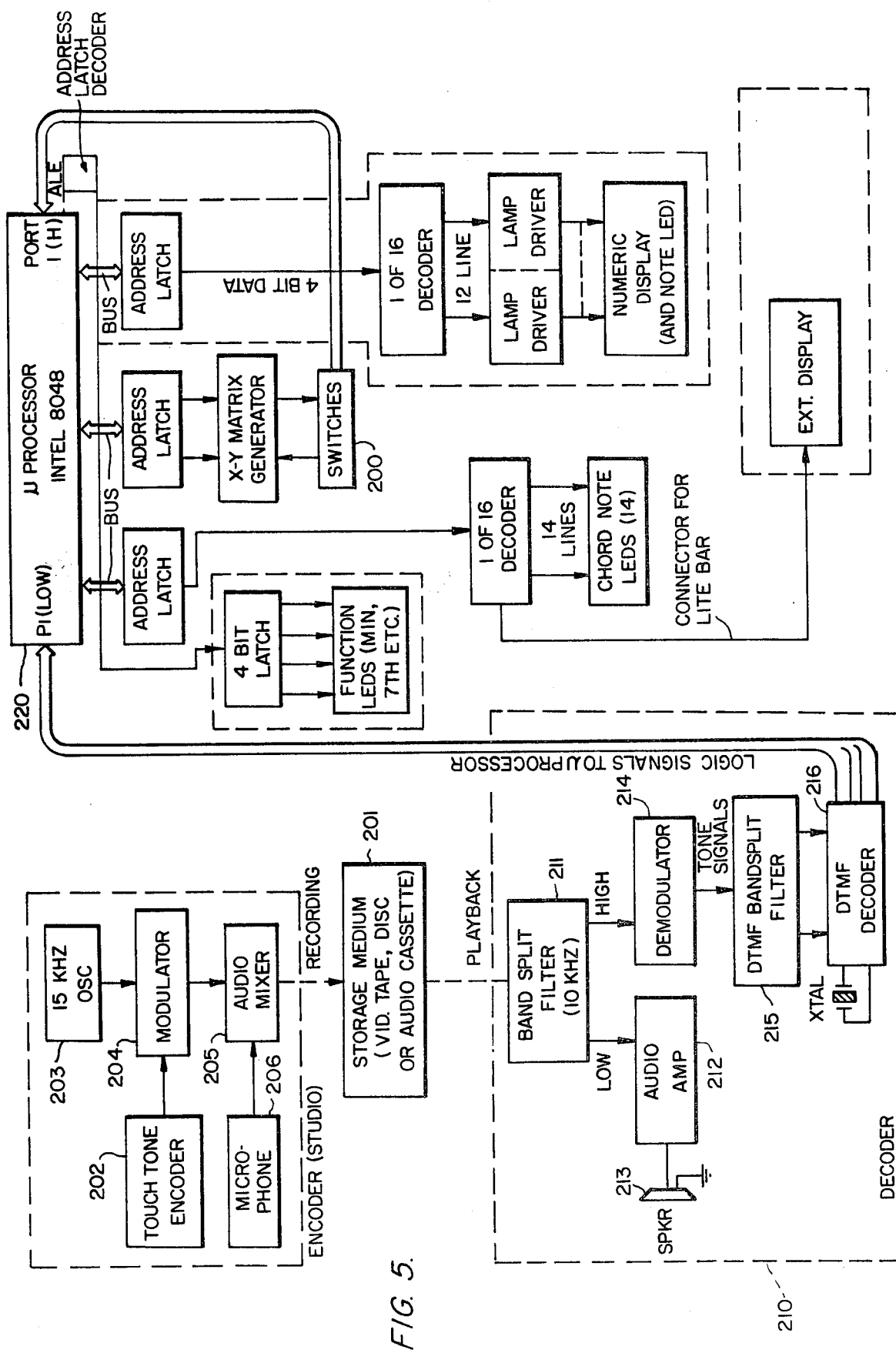
FIG. 5 illustrates a system block diagram of an embodiment of the present invention.

FIG. 5 is a system block diagram of one embodiment of the present invention. FIGS. 6–9 are more detailed schematics of portions of the embodiment illustrated in FIG. 5.

In this embodiment, the device may either be operated manually by means of switches 200 or automatically by means of decoded information stored in the storage medium 201.

To store the information in storage medium 201, the illustrated embodiment utilizes the numerous commercially available Touchtone ™ encoding and decoding devices (e.g.—those manufactured by AMI and Mostek) to digitally store by means of recorded high frequency tones the required information on storage medium 201. That is, signals out of a commercially available encoder 202 are used to modulate the output of a high frequency oscillator 203 in a modulator 204 whose resultant output is fed to an audio mixer 205 along with a microphone audio output 206. The resultant combined output of the audio mixer 205 is then recorded on the storage medium 201. If the frequency of the oscillator 203 is beyond the audio range, but still within the range of storage of the storage medium 201, it will be possible to store the output of the microphone 206 and the output of the encoder 202 on the same track or storage area of the storage medium 201. As an alternative, the audio output of microphone 206 can be stored on one channel or storage area of storage medium 201 and the output of encoder 202 can be stored on a separate channel or storage area of storage medium 201, thus negating the need for elements 203–205.

On playback of the storage medium 201, the decoder 210, utilizing commercially available decoder integrated circuits (see FIG. 8) decodes the initially recorded tone information outputted by the encoder 202 so as to provide a digital signal for automatically operating the device.

In the embodiment illustrated in FIG. 5, a band split filter 211 is utilized to split the signals stored in the storage medium 201 so as to provide an audio signal to audio amplifier 212 feeding speaker 213 which corresponds to the audio output of microphone 206 and to provide a modulated high frequency output to demodulator 214 which corresponds to the output of modulator 204. Demodulator 214 demodulates the resultant signal so as to produce a replica of the output of the encoder 202. A dual tone multi-frequency band split filter and decoder 215 and 216 are then utilized to generate the required digital signals. Such filters and decoders are manufactured by ITT and are commercially available.

While the above-noted description of the encoder and decoder systems, as illustrated in FIG. 5, are more than sufficient to enable one skilled in the art to fabricate these units using commercially available components, one having less than adequate knowledge of such commercially available encoder and decoder elements are directed to the "MOSTEK 1980 TELECOMMUNICATIONS DATA BOOK", printed in 1980 by the Mostek Corporation and discussing in detail tone encoding and decoding systems utilizing their integrated circuits.

The microprocessor 220 may be an Intel Model 8048 or any of the other commercially available microprocessors.

The following description of the preferred embodiment contains details which could be readily apparent to those skilled in the art and have merely been added for the sake of those who have an inadequate knowledge as to the operation of a microprocessor. In addition, there are numerous commercially available publications which disclose in extreme detail the operation and programming of microprocessors. For example, the MCS-48 MICROCOMPUTER USER'S MANUAL, published by the Intel Corporation in 1976 discusses in great detail the operation and programming of their model 8048 microprocessor element (the element actually used in one configuration of the preferred embodiment of the present invention).

Essentially, the entire combination of elements illustrated on the right half of FIG. 5 merely serves as a switching matrix arrangement. That is, assuming a digital input from the decoder 210 and the switches 200, specific outputs are presented to light up the various numeric and LED displays. That is, the microprocessor (which contains its own internal read only memory and random access memory), together with the various address and bit latch units store the various digital inputs from the decoder 210 and the switches 200. They then provide outputs to operate the function LEDs, the chord note LEDs, the numeric display and note LEDs, and the external display (is used). The actual interrelationship between the switches 200, the decoder outputs 210, and the various displays have been previously noted with regard to the descriptions of FIGS. 1-4.

Figure 6:
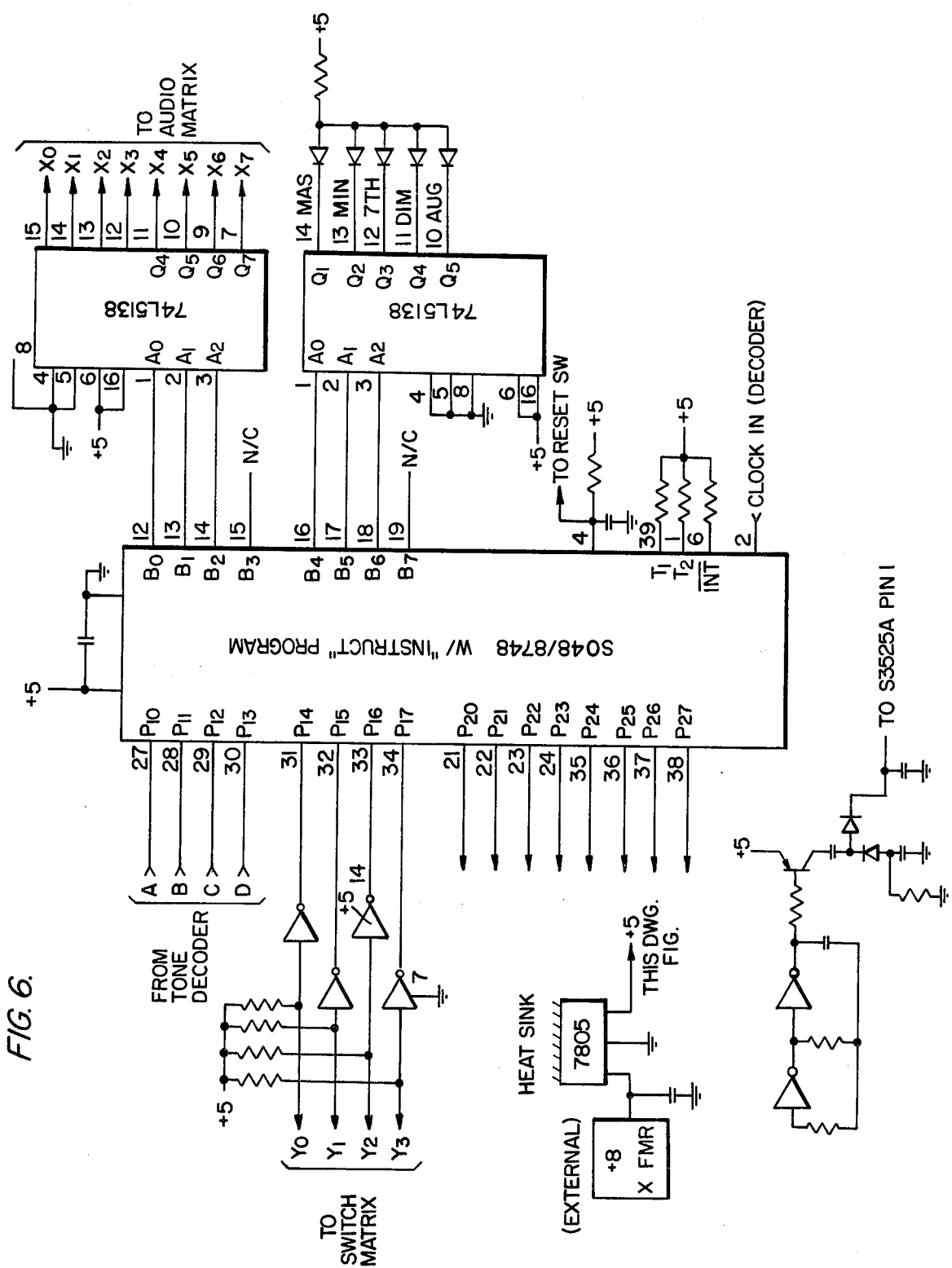

In further detail, FIG. 6 illustrates the interconnection of the microprocessor. Inputs A, B, C, and D correspond to four digital inputs generated by the DTMF decoder 216 illustrated in FIG. 5. Inputs $Y_0$, $Y_1$, $Y_2$, and $Y_3$ from the switch matrix (illustrated in FIG. 9) are fed to inverter driver amplifiers and provide additional inputs to the microprocessor.

There are three sets of microprocessor outputs shown in FIG. 6. One set $B_0$-$B_2$ going to one latch circuit and a second set $B_4$-$B_6$ going to a second latch circuit. An additional set $P_{20}$-$P_{27}$ are outputted to various other elements in the system.

Figure 7:
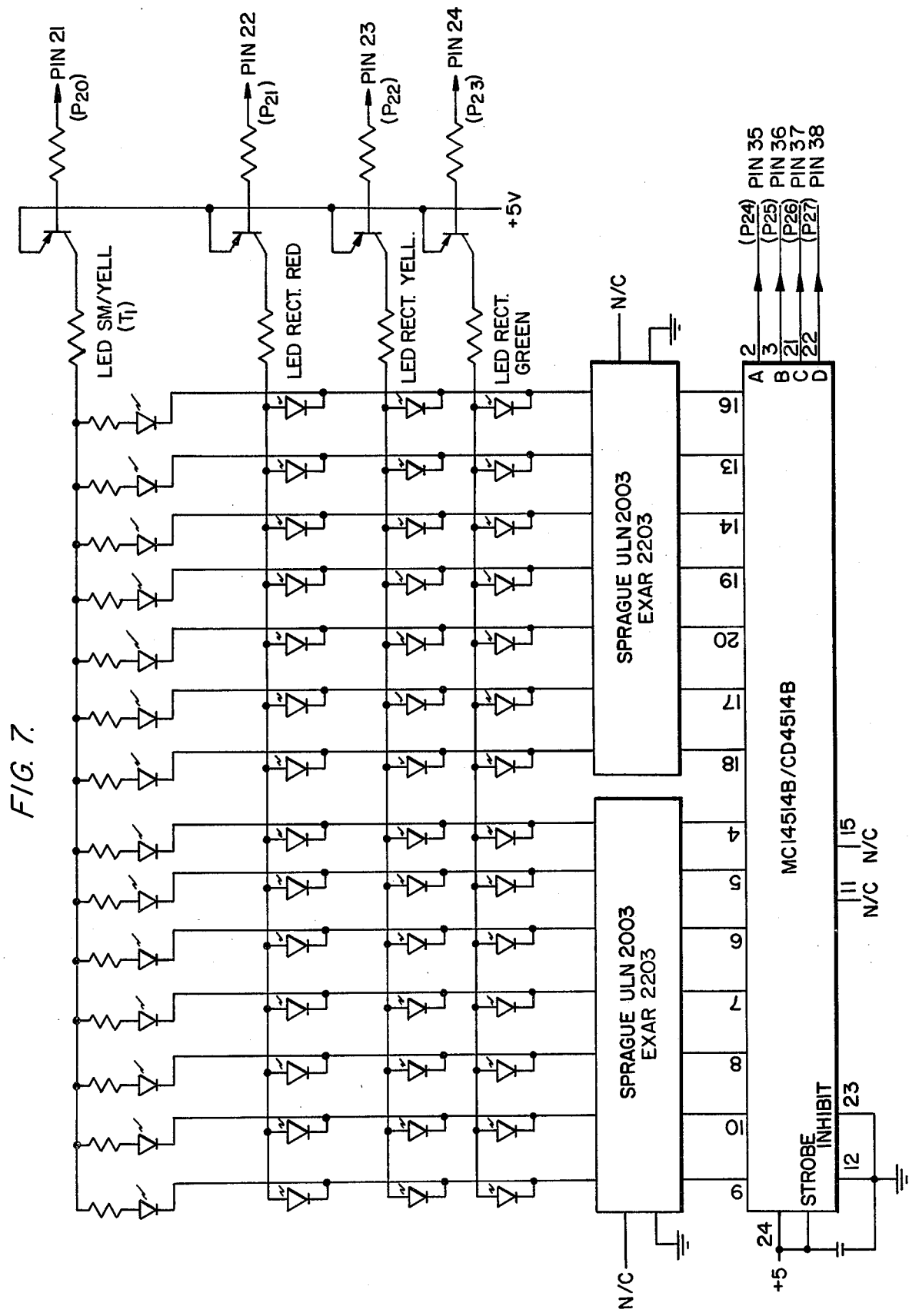

FIG. 7 illustrates an LED matrix and its interconnection to the microprocessor. That is, the four transistors on the upper right hand corner of FIG. 7 are connected to four respective digital outputs of the microprocessor and control the connection of the four rows of LEDs to the +5 volt supply. That is, when the upper most transistor is placed in its saturated state, the top most row of LEDs are connected to the +5 volt supply. Four additional digital inputs from the microprocessor are connected to a one of sixteen decoder (MC14514B/CD4514B) which converts a four bit binary data word into one of sixteen outputs. These outputs (along the top of the one of sixteen decoder) go through driver circuits (Sprague ULN2003) and respectively connect one of the sixteen vertical columns to either +5 volts or ground. Accordingly, if the left most vertical column is grounded and the upper most row is connected to +5 volts, then the LED in the upper left hand corner of FIG. 7 is lit while all of the remaining LEDs are unactivated. This corresponds to the standard diode switching matrix arrangement which has been used for the past thirty years, the only difference being that light activated diodes are used.

Figure 8:
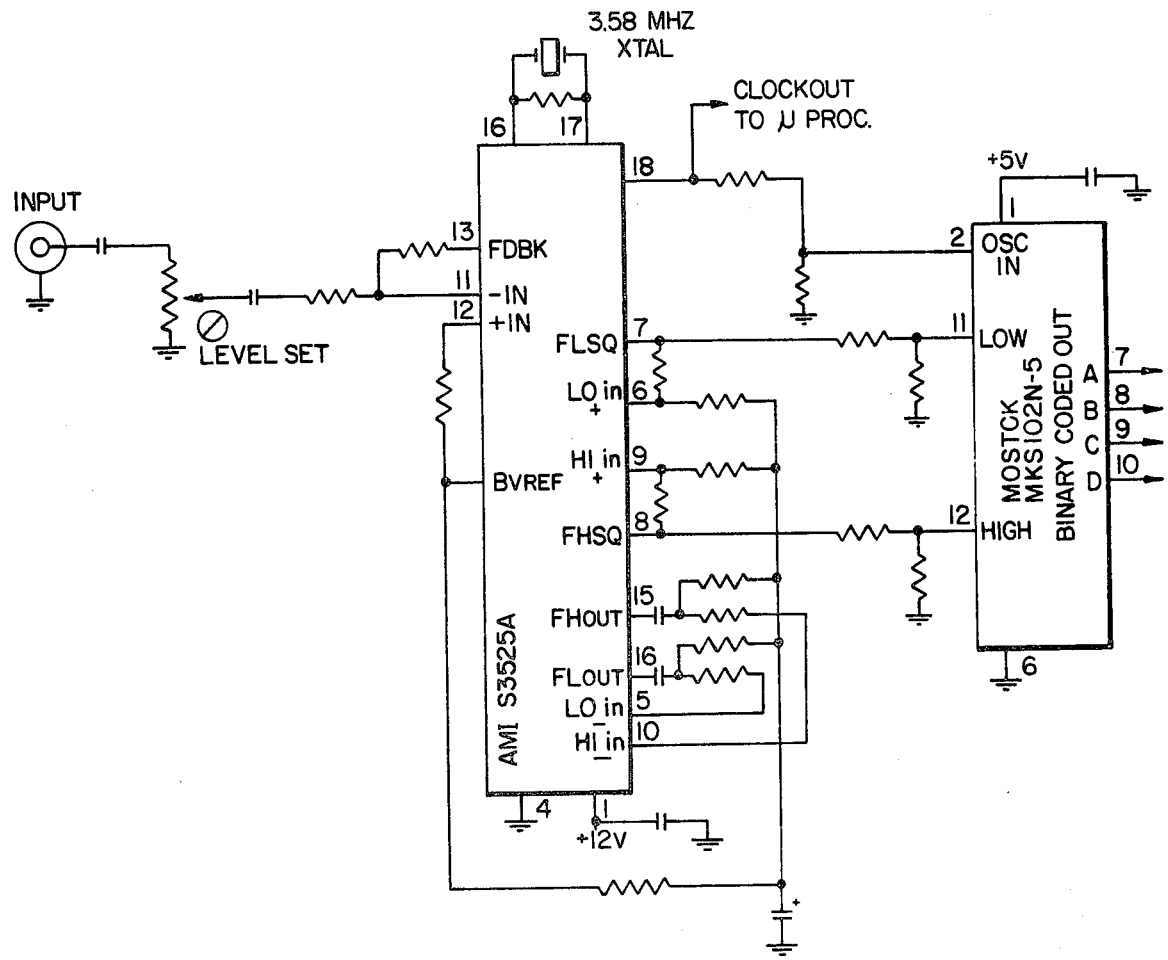
FIGS. 6-9 illustrate partial schematic diagrams of features illustrated in the block diagram of FIG. 5.

FIG. 8 illustrates the actual interconnection of the band split filter 211 and the demodulator 214 illustrated in FIG. 5. The actual part numbers and pin connections are illustrated. Thus, it would only be necessary for one to peruse the manufacturer's data sheets of the integrated circuit elements to ascertain the proper resistance values so as to construct this portion of the circuitry. Accordingly, it is not necessary to go into any further detail, even for one who is not skilled in the art.

Figure 9:
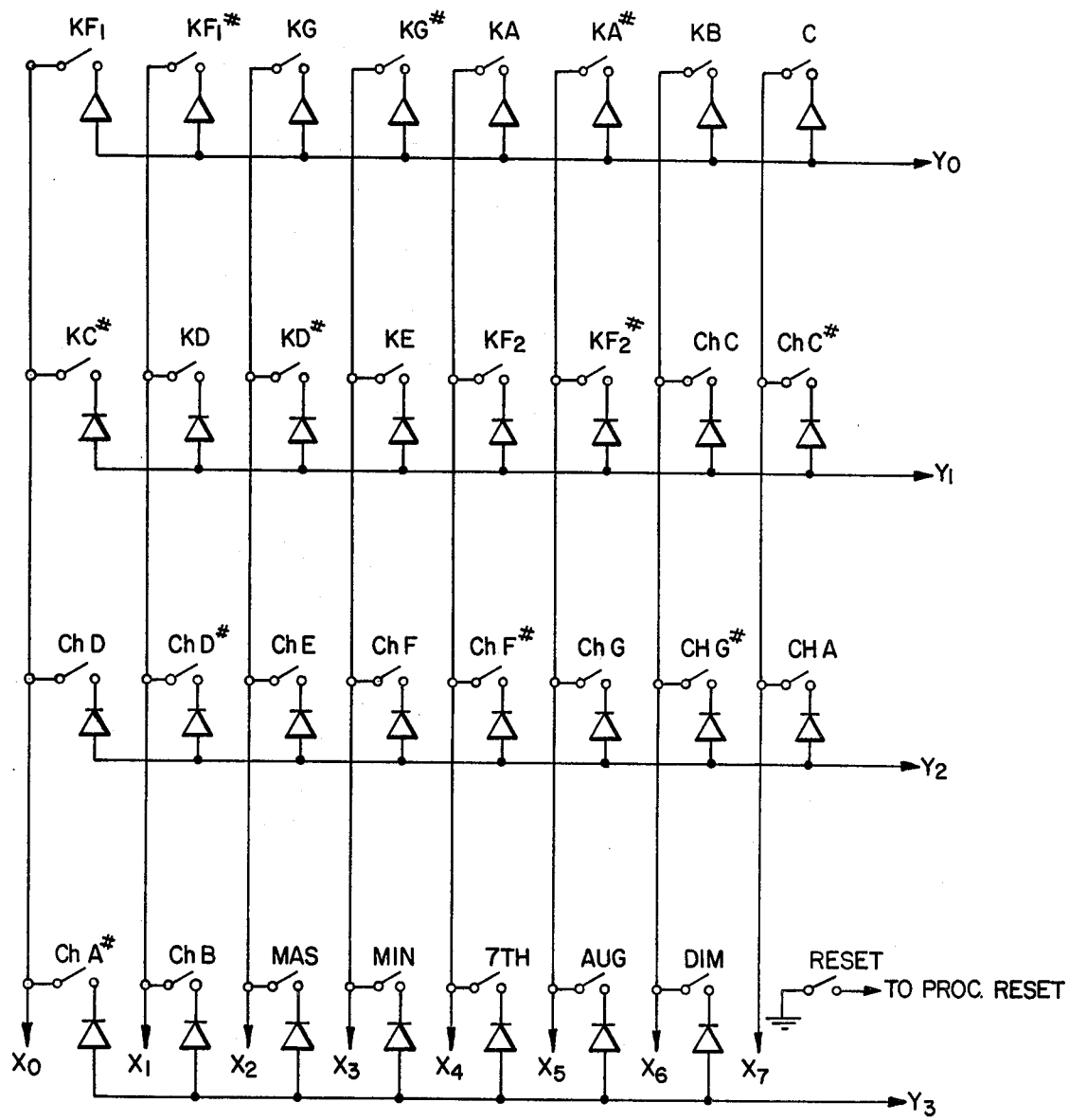
Figure 10:
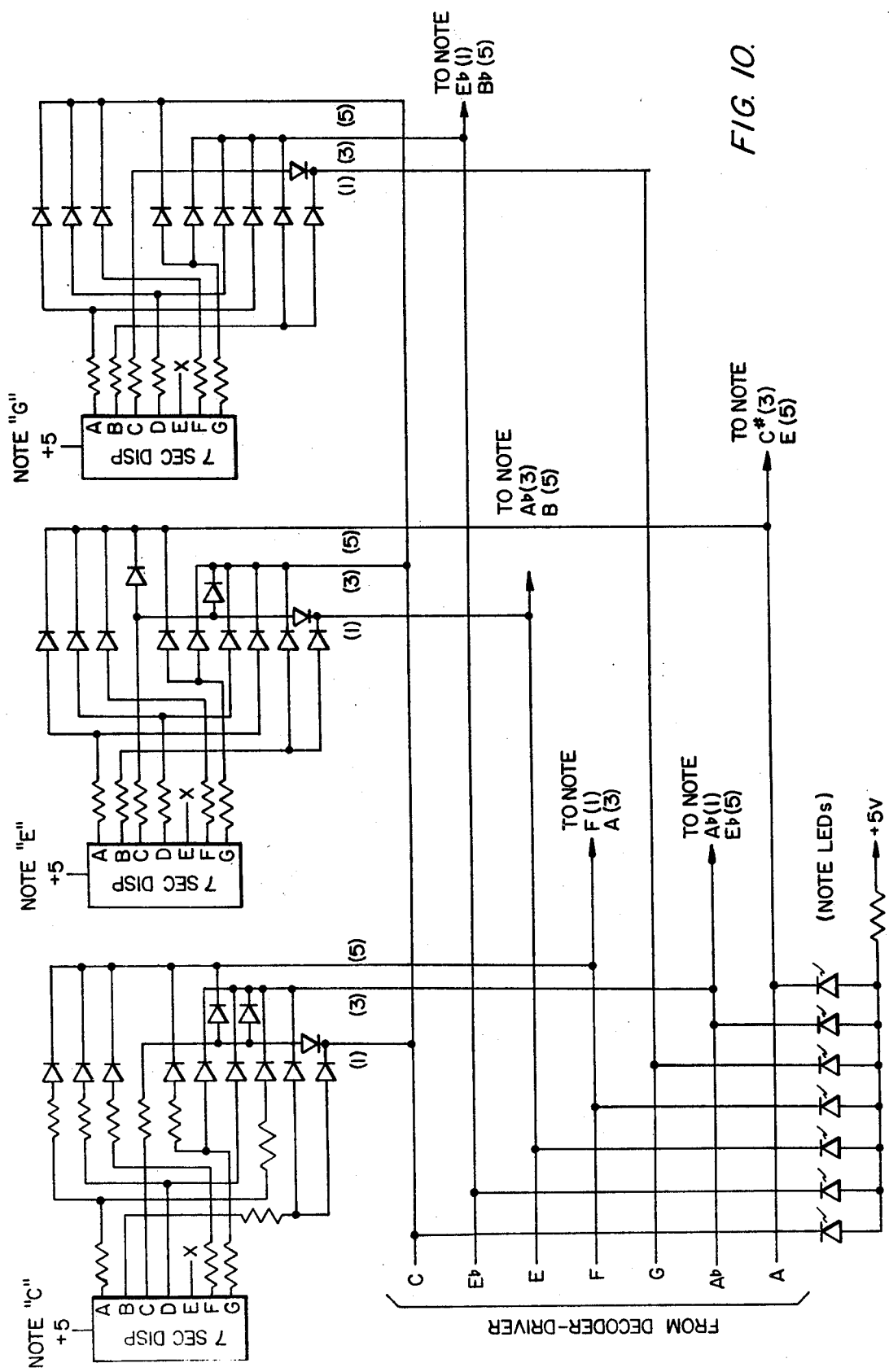

FIG. 9 illustrates the switching matrix connected to the switches 200. As is apparent to one even moderately skilled in the art, by energizing or deenergizing one or more of the inputs $X_0$-$X_7$, one can't energize outputs $Y_0$-$Y_3$ in dependence upon which of the switches has been selected.

Figure 13:
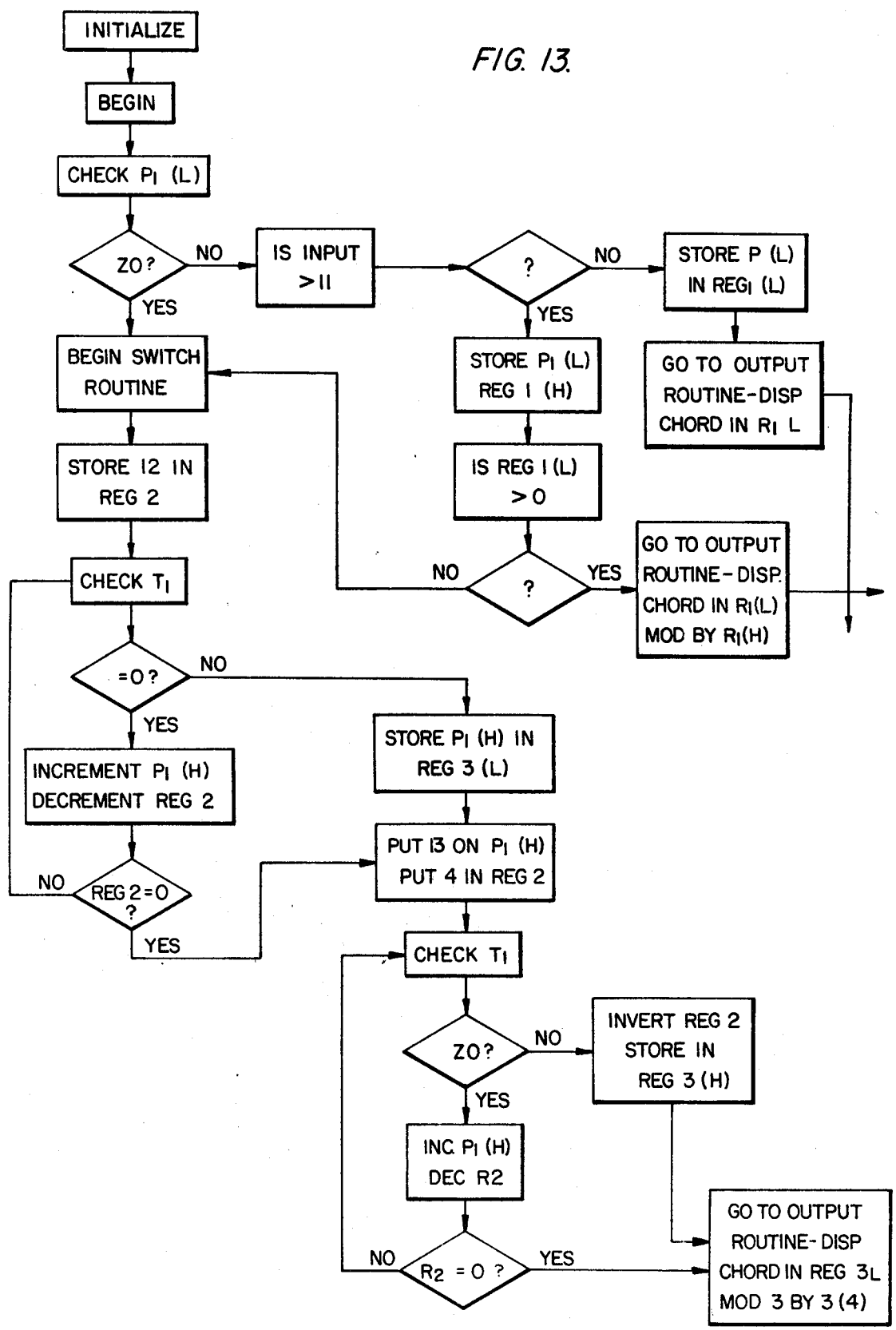
FIGS. 13 and 14 illustrate a flow chart of the operation of the microprocessor illustrated in FIG. 12.
Figure 14:
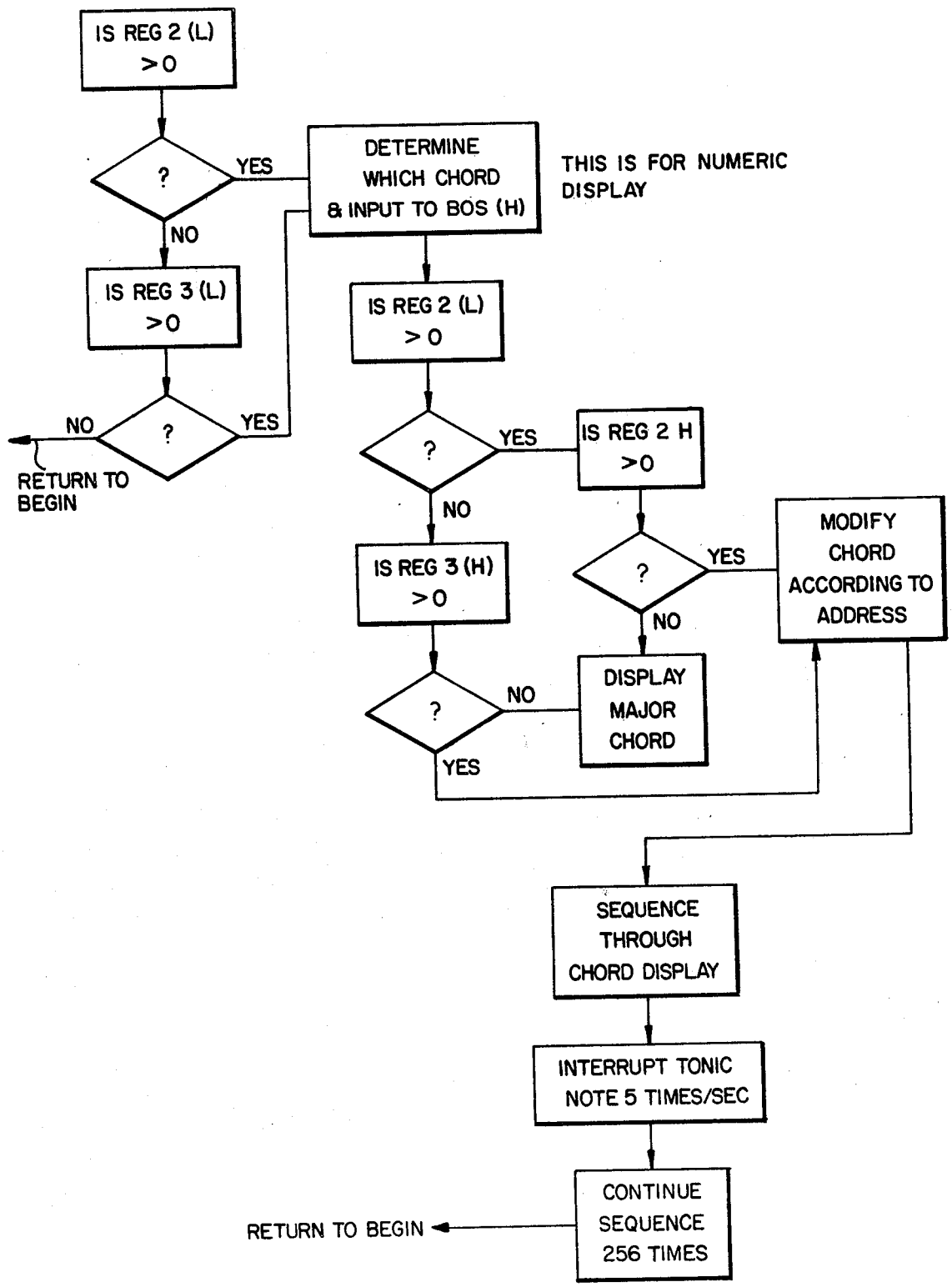

FIGS. 10-14 illustrate a slightly modified embodiment of the device illustrated in FIGS. 5-9. In this somewhat modified embodiment, combined there are some minor changes in the configuration of the switch matrix and indicator drives. FIGS. 13 and 14 provide a flow chart of one method of programming the microprocessor used in the modified embodiment illustrated in FIGS. 10-14. A detailed description of the operation of the microprocessor as shown by the flow chart in FIGS. 13 and 14 have been omitted since one skilled in the art could easily ascertain the operation of the system by referring to FIGS. 10-14. Furthermore, the actual programming of the particular microprocessor utilized in the illustrated embodiment and the use of that particular model microprocessor is by no means unique and could be modified without effecting the overall operation of a device in accordance with the present invention.

It is noted that both the system illustrated in FIGS. 6-9 and the system illustrated in FIGS. 10-14 may be arranged so as to be connected to an electronic keyboard instrument. In such a system, some of the display elements illustrated in FIGS. 3, 4, and 15 may be duplicated in the electronic musical instrument. Furthermore, some of the push-button switches illustrated in FIG. 3 may also be duplicated by switches on the electronic musical instrument. In fact, the actual keys of the musical instrument keyboard may be utilized in parallel with or in place of the switches 100 illustrated in FIG. 3 such that playing the F key on a predetermined octave of the musical instrument keyboard results in the various display indicators lighting up in the same fashion as if the push-button 100 for the key F had been pressed. Such a modification to either the system illustrated in FIGS. 6-9 or the system illustrated in FIGS. 10-14 may be easily effected merely by providing mating connectors on the unit 1' illustrated in FIG. 3 and on the actual electronic musical instrument.

Figure 15:
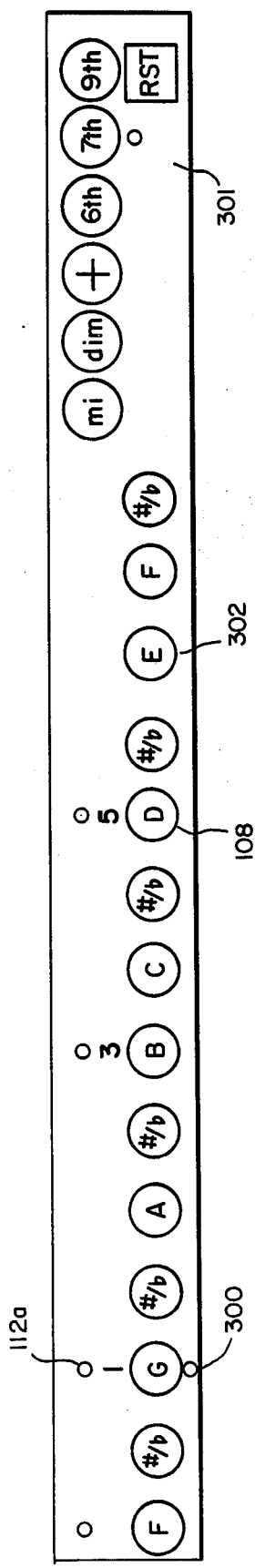
FIG. 15 illustrates a modified external display particularly suited for placement adjacent to the keyboard of a musical instrument.

FIG. 15 illustrates a modified version of the external display illustrated in FIG. 4 of the drawings. This somewhat modified external display has been designed such that it might be directly built in an electronic organ and placed vertically between the upper and lower organ keyboards. The key lights 112a and the alphanumerics 108 operate in the same fashion as that of FIG. 4. However, additional lights 300 (under each key designation 302) light up in response to the energization of the minor, diminished, augmented, etc. keys. That is, indicator light 300 would be illuminated at the appropriate time in response to the energization of the seventh key push-button. Furthermore, an additional indicator 301 would be illuminated in response to the energization of the seventh key push-button.

Figure 16:
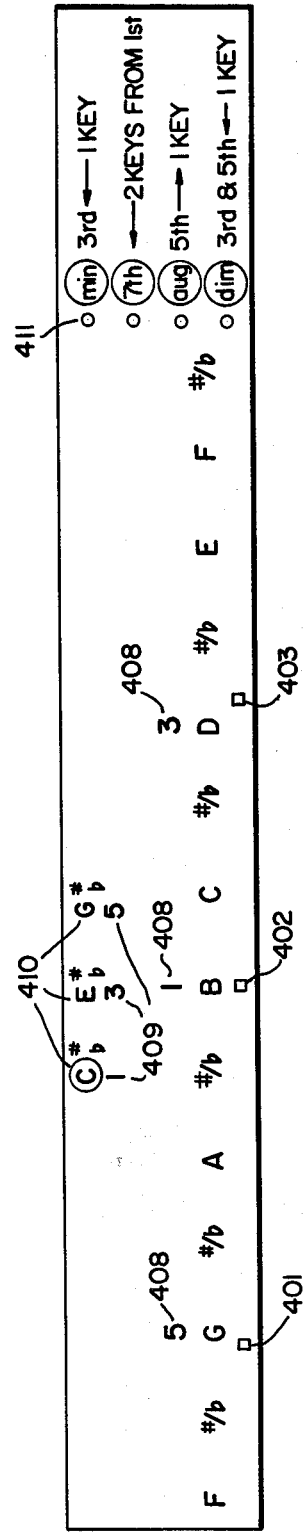
FIG. 16 illustrates an external display for use with a miniature electronic organ.

FIG. 16 illustrates still another variation of the external display of FIG. 4. This display is somewhat different in that it is designed to be operated with one of the new miniaturized portable electronic musical instruments such as the organs manufactured by Casio Incorporated (e.g.—Casiotone Model M—10) or Yamaha (e.g.—Model Nos. P.S. 10, 20).

In operation, rather than pressing one of the twelve chord push buttons 100 as illustrated in FIG. 3, the student presses the actual key on the miniature electronic organ to which the present invention is connected to. That is, to play the C major chord, the student presses the C key on the miniature keyboard. FIG. 16 illustrates the resultant display when the C key is played.

Indicator lights 401, 402, and 403 and numeric displays 408 indicate to the student which keys must be played to play the C major chord. That is, as noted in FIG. 1, to play the C major chord, the G, C, and E keys are played. It is noted that the student will naturally play the keys with the proper fingering (i.e.—as shown in FIG. 1 as the second inversion) since the display clearly illustrates the proper keys to be played and it would be difficult to play these three keys with fingers other than the proper fingers.

As a further learning aid, display 400 containing alpha characters 410 and numerics 409 is included in the display.

It is of course understood, that the various indicators in the display illustrated in FIG. 16 may be color coded as a further aid to the student.

With regard to the playing of the minor, seventh, augmented, etc. chords, the illustration of the rules is presented on the right side of the display. To the left of the rules are indicator lights 411 which are illuminated when the student plays the proper minor, seventh, augmented, etc. chord. That is, when the student properly played the C minor chord by playing the E-flat key rather than the E-natural key, the indicator light 411 to the left of the "min" designation will be illuminated.

Figure 17:
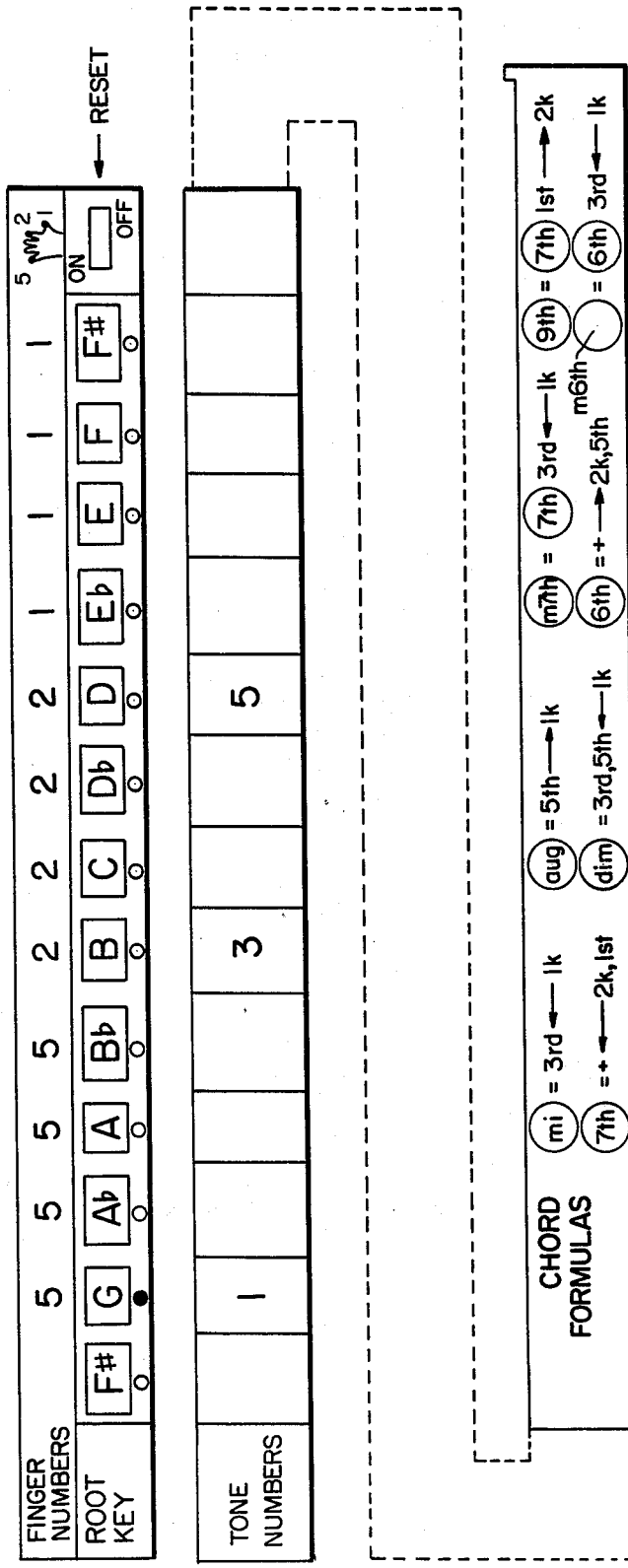
FIG. 17 illustrates another simplified embodiment of the present invention.

FIG. 17 illustrates a simplified embodiment of the present invention which utilizes only twelve key switches, together with thirteen LED digital numeric displays and a novel symbolized unique formula "flip up" display situated directly above the numeric LED display.

As an example, to make a G minor chord, the user presses down the key switch labelled G. The display will then illustrate tone number 1 under the G key, tone number 3 under the B key, and tone number 5 under the D key. Furthermore, a small red LED located directly beneath the G key switch will flash indicating the name of the chord being displayed.

The teaching aid illustrated in FIG. 17 is placed on an actual keyboard or simulation thereof and shows the root or first tone, the third tone, and the fifth tone of the basic G major chord, together with the name of the chord provided by the flashing LED.

To change the previously selected G major chord to a G minor chord, one merely refers to the "flip up" plate and notes that the minor chord is generated by playing the major chord after moving the third tone to the left one key. Thus, in an instant, the user can determine without mental manipulation how to properly play the G minor chord. Similarly, the user could easily assertain how to play the various other chords illustrated in the "flip up" plate.

As to the circuitry required, one skilled in the art could readily determine that all that is needed to fabricate the electrical circuitry corresponding to FIG. 17 are thirteen key switches which are connected to some form of memory latch circuit whose outputs are connected to some form of matrix which drives the tone number displays and the thirteen small LEDs. Since the tone number displays merely have to display the numerics 1, 3, or 5, simplified LED seven segment displays may be utilized.

Figure 18:
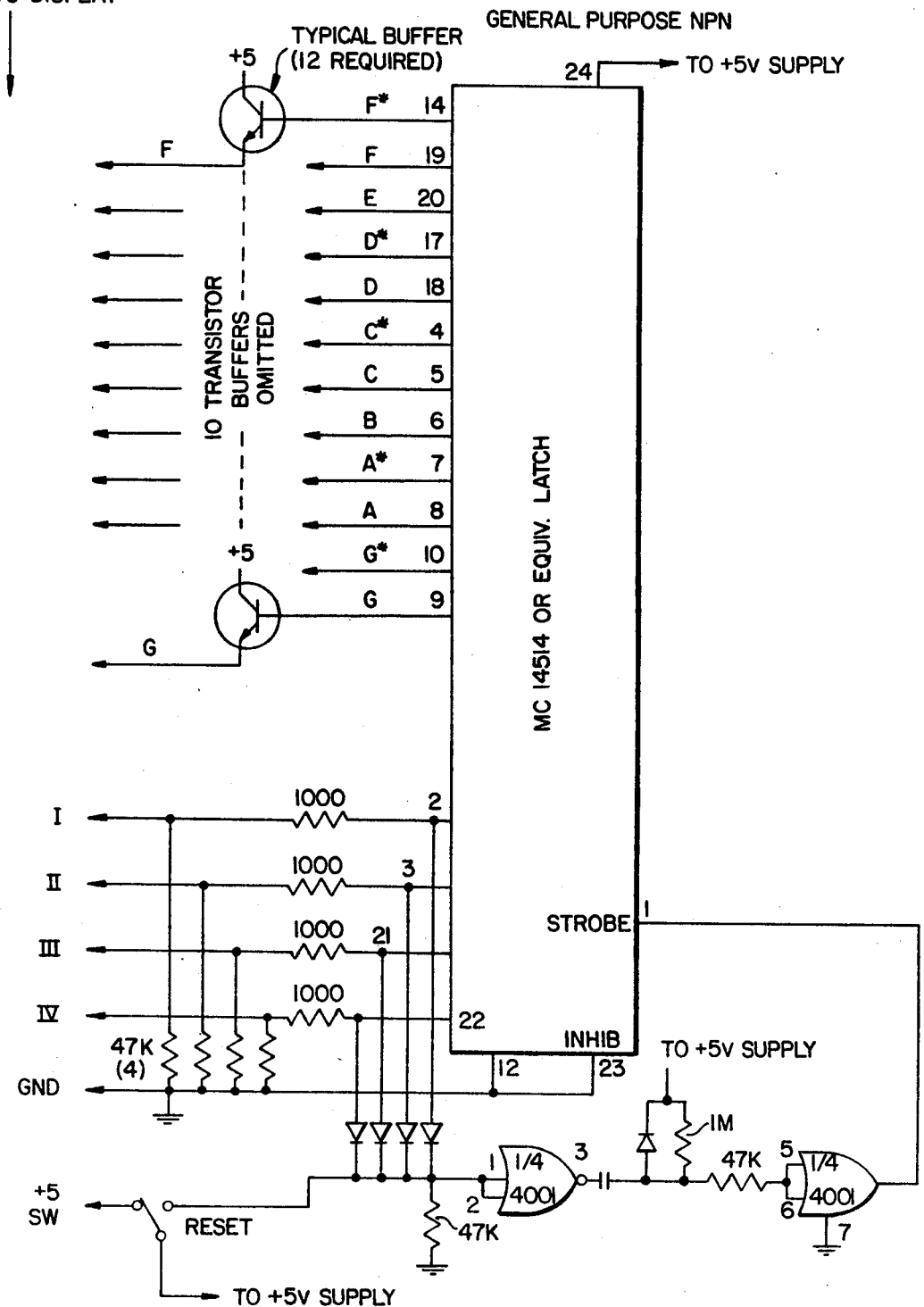
FIGS. 18 and 19 illustrate partial schematic diagrams of the simplified embodiment illustrated in FIG. 17.
Figure 19:
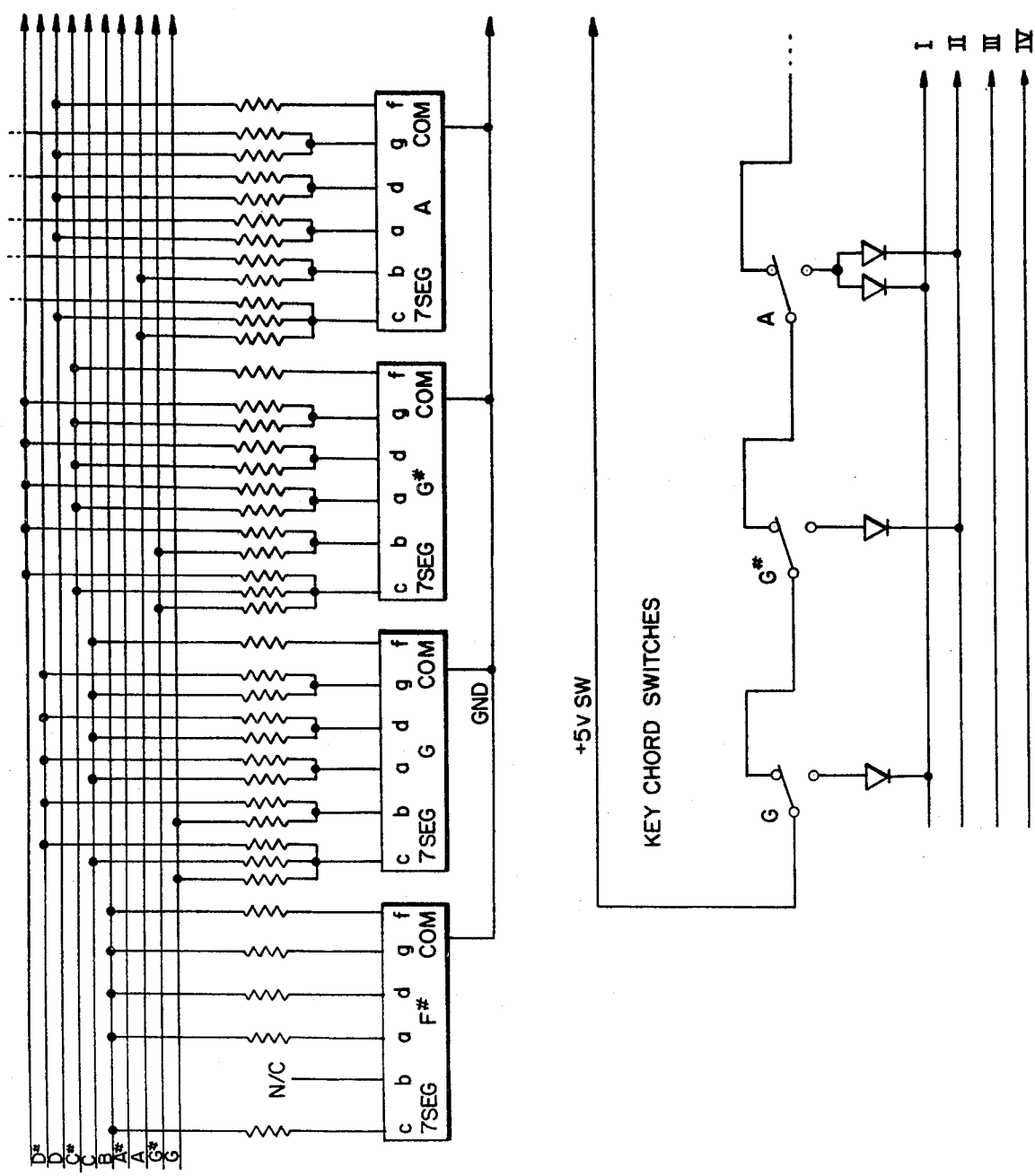

Referring to FIGS. 18 and 19, it is noted that only three of the thirteen key chord switches are illustrated as well as only four of the seven segment displays.

In operation, the operation of one of the key chord switches through the illustrated diodes forming a diode matrix causes the lines labelled I-IV to assume either a zero or +5 volt (logic 1) value. These are fed as inputs to the latch circuit illustrated in FIG. 18. A change in any one of the four inputs causes a delayed strobe signal which is used to latch the values of the four inputs lines into storage in the latch circuit. The latch circuit, consisting of Motorola part number MC14514 or equivalent, also includes a one of sixteen decoder which decodes the four digital inputs into one of sixteen outputs (three of those outputs not being used). The outputs of the latch drive NPN transistors which are operated in their emitter-follower mode as display drivers. These display drivers are used to drive the seven segment displays.

It is further noted that the reset switch grounds all of the four inputs and eventually produces a strobe to reset all the latches and the latch circuit.

The present invention is not limited to the use of the specific circuitry or structure set forth herein inasmuch as the specific details are for illustrative purposes only and constitute only preferred embodiments of the present invention, which is of a scope defined in the following claims.

I claim:

1. A study aid method for teaching self instruction in the makeup of musical chord triads comprising the steps of:
   providing at least one display including a visual representation of a musical instrument keyboard, the keyboard having a plurality of keys and each of the keys having a visual indicator and a numeric display;
   providing a plurality of manual switches, each of which corresponds to a respective major chord triad;
   wherein, when one of the major chord manual switches is depressed, a numeric display for the three keys corresponding to the selected major chord triad are illuminated and a visual indicator corresponding to the depressed major chord manual switch is illuminated, whereby the proper fingering of the selected major chord triad can be immediately ascertained.

2. The method as in claim 1, further comprising the steps of:
   providing a display which illustrates which key of the selected major chord triad must be changed and which direction said key must be changed in order to convert the selected major chord into either a minor chord or an augmented chord;
   providing a display which further indicates which two keys of the selected major chord triad must be changed and the direction which they must be changed in order to convert the selected major chord triad to a diminished chord triad;
   providing a display which further indicates the addition and location of a fourth tone which must be added to the selected major chord triad to convert said major chord triad into one of either a seventh chord or a sixth chord;
   providing a display which further illustrates which of the keys of one of either a seventh chord or a sixth chord have to be changed and which direction they have to be changed in order to convert one of either said seventh chord or sixth chord respectively into one of either a minor seventh chord or a ninth chord and a minor sixth chord.

3. A study aid method for teaching self instruction in the makeup of musical chord triads comprising the steps of:
   providing at least one display including a visual representation of a musical instrument keyboard, the keyboard having a plurality of keys and each of the keys having a visual indicator and a numeric display;
   providing a plurality of manual switches, each of which corresponds to a respective major chord triad;

providing a plurality of additional manual switches, each of which corresponding to a respective one from the group consisting of minor chord triads, sixth chord triads, seventh chord triads, ninth chord triads, diminished chord triads, and augmented chord triads;

wherein, when one of the major chord manual switches is depressed, a visual indicator and a numeric display for the three keys corresponding to the selected major chord triad are illuminated whereby the proper fingering of the selected major chord triad can be immediately ascertained;

and wherein when one of said additional manual switches is depressed subsequent to the depression of one of the major chord triad switches, visual indicator lights of said visual indicator are illuminated whereby the proper fingering of the chord triad corresponding to the depression of the two manual switches can be ascertained.

4. The method as in claim 3, further comprising the steps of:

providing a control means connected to the display;

providing a storage medium having information stored therein and a storage medium playback means for operating the control means;

wherein the control means is controlled by the information stored in the storage medium and extracted by the storage medium playback means to simulate the depression of the plurality of manual switches.

5. The method as in claim 4, further comprising the steps of:

providing a visual display having a visual image of a hand operating a keyboard;

providing an audio transducer for providing audio signals corresponding to the playing of the plurality of keys;

wherein the control means utilizes the information stored in the storage medium and extracted by the storage medium playback means to visually display an image on the visual display of the hand operating the keyboard and simultaneously emitting sounds from the audio transducer corresponding thereto and simultaneously operating the visual indicator and numeric display so as to correspond thereto, whereby one can ascertain the chord triad being depicted on the visual display and the correct fingering thereof and can simultaneously hear the sounds corresponding to the playing of the depicted chord triad.

6. A study aid for use in self instruction in the make up of musical chord triads comprising:

a control means having a plurality of inputs and a plurality of outputs, each of said plurality of outputs corresponding to at least one of said plurality of inputs;

at least one display means including a visual representation of a hand operating a musical instrument keyboard, said keyboard having a plurality of keys and each of said keys having a visual indicator and a numeric display;

a signal generator means having a plurality of outputs respectively electrically connected to said plurality of inputs of said control means for providing a plurality of signals thereto;

wherein said display is electrically connected to at least one of said plurality of outputs of said control means such that each output of said plurality of outputs of said signal generator means is processed by said control means to operate at least one predetermined visual indicator and numeric display of said at least one display means;

wherein said signal generator means further comprises:

a plurality of manual switches operatively connected to a matrix means, wherein the operation of each of said plurality of manual switches produces a predetermined resultant output from said signal generator means;

a storage medium having information stored therein; and a storage medium playback means for generating signals corresponding to the information stored in said storage medium, said signals being used as inputs for said control means; and wherein said storage medium stores information corresponding to said visual image of a hand operating a keyboard corresponding to said keyboard of said at least one display means;

said playback means arranged to provide signals for a visual display said signals corresponding to said visual image of said hand operating said keyboard;

said recording medium further storing information corresponding to sounds to be emitted when said visual image of said hand operates said keyboard;

said playback means further comprising means for providing signals to an audio transducer for reproducing said sounds to be emitted;

wherein said visual image on said visual display of said hand operating said keyboard simultaneously results in the emission of sounds from said audio transducer and the operation of at least one visual indicator and numeric display on said at least one display means.

* * * * *